June 10, 1958 A. T. WEI 2,838,044
TRIPLE CONTAINER FOR FOOD
Filed April 18, 1956 2 Sheets-Sheet 1

INVENTOR.
ANDREW TOHCHUNG WEI
BY
ATTORNEY

June 10, 1958  A. T. WEI  2,838,044
TRIPLE CONTAINER FOR FOOD
Filed April 18, 1956  2 Sheets-Sheet 2

INVENTOR.
ANDREW TOHCHUNG WEI
BY
ATTORNEY

United States Patent Office 2,838,044
Patented June 10, 1958

2,838,044

TRIPLE CONTAINER FOR FOOD

Andrew Tohchung Wei, New York, N. Y.

Application April 18, 1956, Serial No. 579,065

2 Claims. (Cl. 126—369.3)

This invention relates generally to articles for maintaining foods in a heated condition, although having regard also to the cooling of foods. More particularly, the invention has reference to that class of culinary utensils generally known as boilers. Most usually, utensils of this type are in the form of double boilers. In accordance with the present invention the article is a triple boiler, and is designed to provide, in addition to the compartment in which steam is produced, at least two other compartments separately adapted for holding foods to be heated.

Although in the illustrated embodiment two additional containers for food are referred to, as will be apparent the number can be increased above this amount, merely by the addition of other containers adapted to interfit with those shown and described.

The main object of the present invention is to permit different foods to be heated in two or more containers above a single flame or heating element, in an arrangement such that steam produced in a bottom container will be circulated through a plurality of vertically spaced chambers alternating with the food compartments.

More specific objects are to provide a device of the nature described capable of manufacture at relatively low cost; readily adapted for assembly or disassembly; adapted to occupy a minimum of space above the heat producing means; adapted for engagement of selected, paired containers by a single handle; and adapted for ordinarily supporting said handle in an out-of-the-way position upon the lowermost container.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
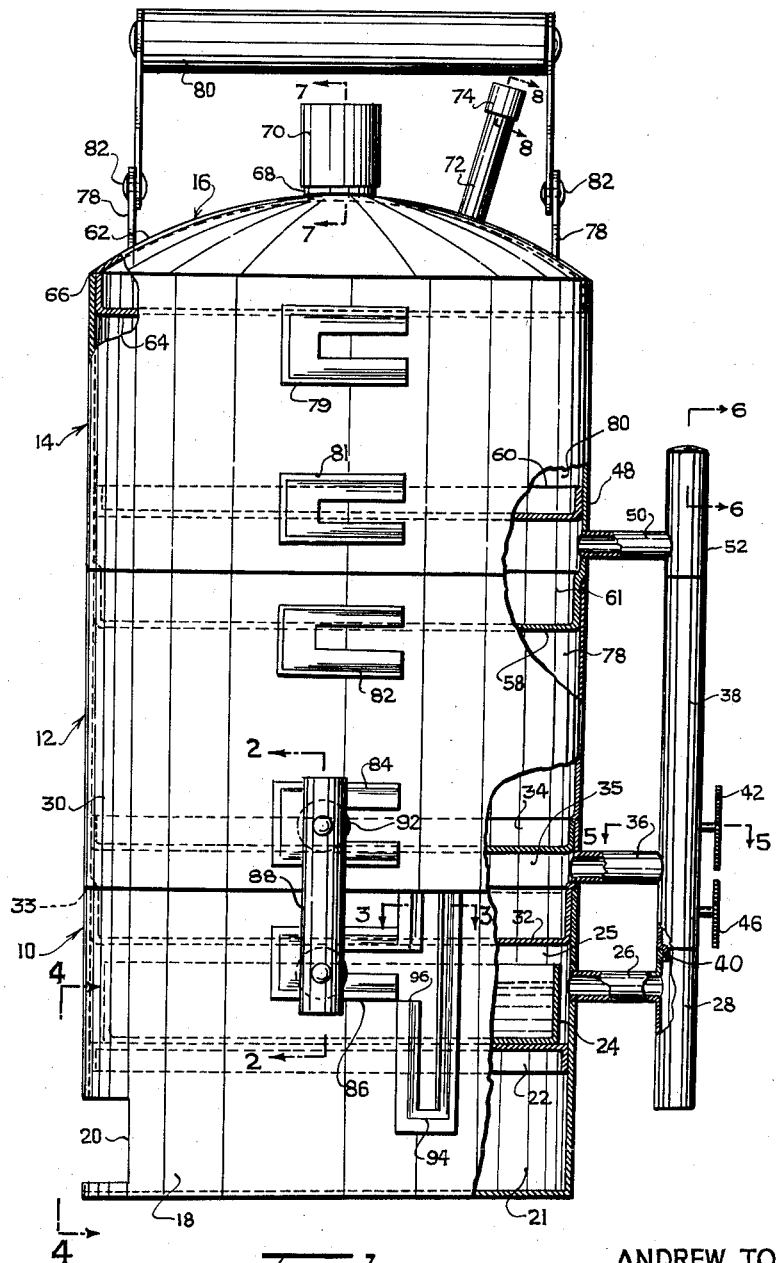
Fig. 1 is a view partly in side elevation and partly in longitudinal section of a triple boiler formed according to the present invention.
Figure 2:
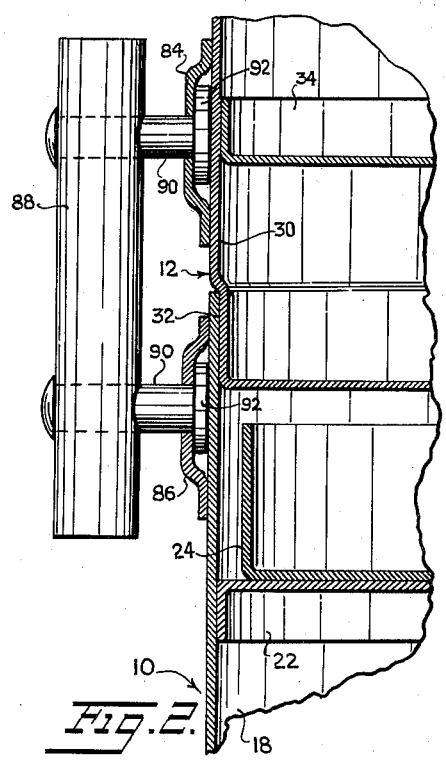
Fig. 2 is an enlarged sectional view on line 2—2 of Fig. 1, illustrating the handle means.

In the illustrated embodiment the boiler includes a bottom container 10, an intermediate container 12, a top container 14, and a lid 16. As will presently appear, any number of the intermediate containers 12 can be used, one being shown only by way of example.

Figure 4:
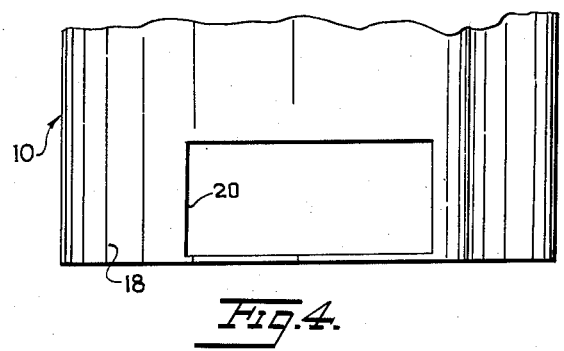
Fig. 4 is a fragmentary elevational view of the device as seen from the left of Fig. 1, on indicating line 4—4.

Considering first the construction of the bottom container, this comprises a cylindrical receptacle 18 having a closed bottom adjacent which there is a large, circumferentially extending opening 20 (Fig. 4). Means, not shown, adapted to produce heat is insertable through the opening 20 into a heating chamber 21 defined between the container bottom and a transverse partition 22 fixedly secured to the container side wall throughout the periphery of said partition.

Alternatively, the entire device can be positioned upon a stove, so that the heat will be applied to the bottom 18, rather than to the partition 22. Under these circumstances, it may be desirable to eliminate the chamber 21 and support a water tray 24 directly upon the container bottom, with opening 20 being wholly eliminated.

In any event, in the illustrated embodiment the use of the partition 22 defines in addition to the heating chamber 21 a steam chamber 25 within which tray 24 is disposed, and communicating with chamber 25 is a laterally, outwardly extending connecting tube 26 opening into a vertically disposed lower conduit section 28 having a closed bottom.

The intermediate container 12 includes a cylindrical receptacle 30, having a closed bottom 32 and a circumferential shoulder 33 adjacent said bottom. The lower end of the container 12 is thus reduced for removably seating the same in the container 10 with the shoulder bearing upon the upper end of container 10.

Spaced above the bottom wall 32 is a transverse partition 34, cooperating with bottom 32 in forming a steam chamber 35 with which communicates a laterally extending connecting tube 36 opening into an elongated intermediate conduit section 38 having a reduced lower end 40 seating in the upper end of section 28 in communication therewith.

Figure 5:
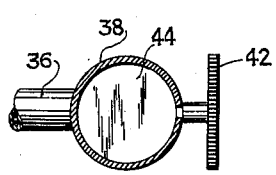
Fig. 5 is an enlarged, detail sectional view through the steam conduit on line 5—5 of Fig. 1.

Mounted in section 38 above tube 36 (Fig. 5) is a valve including a rotary handle 42 the shaft of which is connected to a valve disc 44 of the butterfly type. Any of various other valves can be employed, it being mainly important that the user be permitted to close or open section 38 above tube 36.

Below tube 36 there is mounted in section 38 a second valve 46 similar to valve 42.

Figure 6:
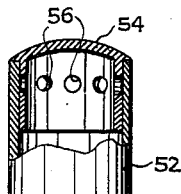
Fig. 6 is an enlarged, detail sectional view through the upper end of the conduit on line 6—6 of Fig. 1.

The top container 14 includes a cylindrical receptacle 48 from which extends a connecting tube 50 communicating with an upper conduit section 52 the lower end of which is in communication with and seats in the upper end of section 38 in the same manner that section 38 seats in section 28. Referring to Fig. 6, relief valve means is provided in the upper end of section 52 in the form of a cap 54 having a circumferential series of outlet ports 56. Cap 54 has a circumferential shoulder seating upon the upper end of section 52. The cap gravitates to its normal position of Fig. 6, in which position ports 56 are closed. When the pressure within the conduit rises above a predetermined value, the cap lifts to expose the ports and permit the escape of excess steam.

Container 14 has its lower end closed as at 58, and reduced for seating in the upper end of container 12. Spaced above bottom end wall 58 is a partition 60, defining with the end wall a chamber 61 for steam.

The upper end of container 14 is formed open, and seating in said upper end is the lid 16. This is of hollow, sealed formation and includes a dome-shaped top wall 62 and a flat bottom wall 64 about which extends a downwardly facing shoulder 66 seating upon container 14.

Figure 7:
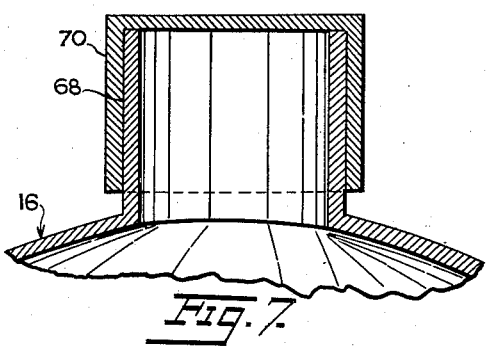
Fig. 7 is an enlarged, detail sectional view through the filling neck of the lid, on line 7—7 of Fig. 1.

The lid may be filled with water to be heated, either for the purpose of providing a supply of said water or for the purpose of aiding in keeping the foods hot after the heat producing means has been removed. Accordingly, a filler neck 68 extends upwardly from top wall 62 communicating with the interior of the lid (Fig. 7) and is normally closed by a cap 70.

Figure 8:
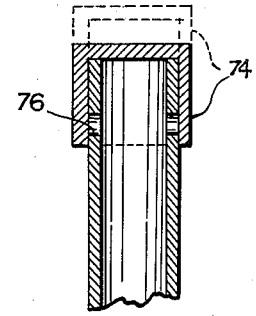
Fig. 8 is an enlarged, detail sectional view through the relief vent of the lid on line 8—8 of Fig. 1.

In the event the liquid in the lid becomes heated to an excessive degree, relief is afforded through the provision of a vent tube 72 (Fig. 8) normally closed by a cap 74 and having vent openings 76. The cap normally covers the vent openings, but may be elevated when the pressure within the tube rises above a predetermined value, so that steam may escape through apertures 76.

It will be seen that the construction, after the several containers are assembled with one another, results in a continuous steam conduit defined by the interfitted sections carried by the respective containers, so that steam produced in chamber 25 flows upwardly through said conduit and circulates through chambers 35, 61 with these chambers alternating with food receiving compartments 78, 80.

In use, one may desire that steam be produced in a desired amount within chamber 25 before permitting said steam to circulate through chambers 35, 61. Under these circumstances, valve 46 and valve 42 may initially be closed. When the steam pressure has risen to a desired extent, the valve 46 may be opened and under these circumstances, steam will circulate only through chamber 35. If circulation is desired through chamber 61, valve 42 is also opened.

It will be understood that relief valves can be employed at any location desired in the structure, so that under no circumstances will an excessive head of steam be built up. The provision of relief means for this purpose is believed well within the skill of those working in the art, and hence special illustration of relief valves at locations other than those shown is not thought necessary.

Should it be desired to add additional containers, these can be interposed between the container 12 and container 14. It is merely necessary that the additional containers be formed similarly to container 12, with conduit sections formed similarly to the section 38. It will thus be apparent that a substantial number of food containers can be stacked with their steam chambers in communication, so that a number of different foods can be heated without difficulty over a single heat producing means.

Figure 3:
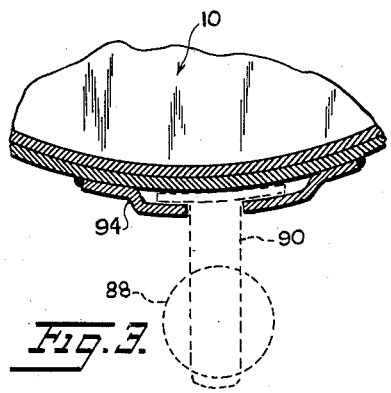
Fig. 3 is an enlarged transverse sectional view on line 3—3 of Fig. 1 showing the means for supporting the handle in an inoperative position.

Handle means is provided on the device, and to this end there is a vertical series of C-shaped keepers 79, 81, 82, 84 and 86 on the several containers. There is one keeper on container 10, and two each on containers 12 and 14. These are so formed as to define horizontal slots open at one end, said slots being in communication at their sides and at their closed ends with shallow recesses. A single handle 88 has vertically spaced arms 90 formed with discs 92. If it is desired to engage the handle with keepers 84, 86 as shown in Fig. 1, the arms 90 are inserted through the slots of the keepers with discs 92 in the recesses of the keepers. The handle can be connected with equal ease to keepers 82, 84 or alternatively, to keepers 81 and 82 or 79 and 81. This permits any single container or any pair of adjacent containers to be lifted by the single handle. When the handle is not in use (see Figs. 1 and 3) it is inserted in a vertical, elongated keeper 94 mounted upon container 10, said keeper having an opening 96 at one side communicating with the slot of keeper 86. One can shift the handle from the Fig. 1 to the Fig. 3 position thereof merely by lateral movement of the handle to the right in Fig. 1, followed by downward movement thereof to an extent sufficient for engaging discs 92 in keeper 94.

A carrying handle 80 is provided for carrying the stacked containers. Handle 80 is secured by rivets 82 to lugs 78 on lid 16.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A boiler for food, comprising a plurality of cylindrical containers stacked vertically one upon the other, all the containers above the lowermost container of the stack having closed bottoms proportioned for nesting in the next lower container, the lowermost container having a transverse partition dividing the same into steam and heating chambers, a tray supported upon the partition adapted to hold a quantity of water to be converted into steam upon application of heat through said partition, all of the containers above the lowermost container each having a transverse partition therein defining an upper food compartment and a lower steam chamber, a connecting tube extending radially outward from each of the steam chambers, a conduit section secured perpendicularly to each connecting tube, each of the conduit sections being interfitted with each other and in communication with the steam chamber in the lowermost container for providing steam therefrom to the steam chambers in the upper containers, at least one of the food compartments being heated by steam circulating in steam chambers above and below said one food compartment, and a lid removably seated in the uppermost one of said containers, said lid closing the food compartment in the uppermost container, said lid being in the form of a substantially closed compartment for containing hot water.

2. A boiler for food, comprising a plurality of cylindrical containers stacked vertically one upon the other, all the containers above the lowermost container of the stack having closed bottoms proportioned for nesting in the next lower container, the lowermost container having a transverse partition dividing the same into steam and heating chambers, a tray supported upon the partition adapted to hold a quantity of water to be converted into steam upon application of heat through said partition, all of the containers above the lowermost container each having a transverse partition therein defining an upper food compartment and a lower steam chamber, a connecting tube extending radially outward from each of the steam chambers, a conduit section secured perpendicularly to each connecting tube, each of the conduit sections being interfitted with each other and in communication with the steam chamber in the lowermost container for providing steam therefrom to the steam chambers in the upper containers, at least one of the food compartments being heated by steam circulating in steam chambers above and below said one food compartment, and a lid removably seated in the uppermost one of said containers, said lid closing the food compartment in the uppermost container, said lid being in the form of a substantially closed compartment for containing hot water, a handle secured to said lid for carrying the stacked container, and means for removably securing certain of the stacked containers together, said means comprising a plurality of substantially C-shaped keepers mounted on the outer surface of the containers in alignment with each other, the openings in the keepers opening on the same side, an elongated cylindrical member having arms radiating from both ends thereof, and discs on the outer ends of said arms removably inserted into at least one pair of adjacent keepers in underlapping relation with the edge walls of the openings thereof.

References Cited in the file of this patent

UNITED STATES PATENTS

| | | |
|---|---|---|
| 268,732 | Salmon | Dec. 5, 1882 |
| 367,240 | Salmon | July 26, 1887 |
| 653,863 | Dunlap | July 17, 1900 |
| 908,850 | Finch | Jan. 5, 1909 |
| 1,290,771 | Meadows | Jan. 7, 1919 |
| 1,423,406 | Donley | July 18, 1922 |
| 1,920,330 | Towns | Aug. 1, 1933 |
| 2,024,294 | Kirsch | Dec. 17, 1935 |
| 2,242,779 | Erdos | May 20, 1941 |
| 2,624,487 | Fry | Jan. 6, 1953 |